US008220827B2

(12) United States Patent
Schirm

(10) Patent No.: US 8,220,827 B2
(45) Date of Patent: Jul. 17, 2012

(54) FASTENER AND METHOD FOR TRIGGERING A SIDE AIRBAG

(75) Inventor: Sven Schirm, Oestrich-Winkel (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/880,726

(22) Filed: Sep. 13, 2010

(65) Prior Publication Data

US 2011/0062683 A1 Mar. 17, 2011

(30) Foreign Application Priority Data

Sep. 14, 2009 (DE) .......................... 10 2009 041 130

(51) Int. Cl.
*B60R 21/21* (2006.01)
*F16B 21/06* (2006.01)

(52) U.S. Cl. .................... 280/728.2; 280/730.2; 24/289; 24/458; 411/508; 296/1.08

(58) Field of Classification Search .................... 24/289, 24/293, 295, 457, 458; 280/728.2, 730.2; 296/1.08; 411/508, 522, 523, 524
See application file for complete search history.

(56) References Cited

U.S. PATENT DOCUMENTS

| | | | |
|---|---|---|---|
| 3,673,643 A * | 7/1972 | Kindell | 24/458 |
| 4,927,287 A | 5/1990 | Ohkawa et al. | |
| 5,403,034 A | 4/1995 | Gans et al. | |
| 6,101,686 A * | 8/2000 | Velthoven et al. | 24/295 |
| 6,145,870 A | 11/2000 | Devane et al. | |
| 6,431,584 B1 * | 8/2002 | Nagasawa et al. | 280/728.2 |
| 7,428,770 B2 | 9/2008 | Dickenson et al. | |
| 2004/0052575 A1 | 3/2004 | Draggoo et al. | |
| 2007/0137004 A1 * | 6/2007 | Baekelandt | 24/289 |
| 2008/0028577 A1 * | 2/2008 | Soman et al. | 24/293 |
| 2009/0205174 A1 * | 8/2009 | Slobodecki et al. | 24/458 |

FOREIGN PATENT DOCUMENTS

| | | |
|---|---|---|
| DE | 4419738 C1 | 8/1995 |
| EP | 0873916 A1 | 10/1998 |
| EP | 1091132 A2 | 4/2001 |
| EP | 2090475 A1 | 8/2009 |
| JP | 3177607 A | 8/1991 |

OTHER PUBLICATIONS

German Patent Office, German Search Report for German Application No. 102009041130.5, Nov. 2, 2010.
Great Britain Patent Office, British Office Action for Application No. GB1014930.0, dated Dec. 8, 2010.

* cited by examiner

*Primary Examiner* — Joseph Rocca
(74) *Attorney, Agent, or Firm* — Ingrassia Fisher & Lorenz, P.C.

(57) ABSTRACT

A fastener for an inner panel of a motor vehicle has a proximal fastening foot for connection to the inner panel and a distal retaining clip for the captive fastening in a retaining opening of a vehicle body reinforcement. A retaining ramp, which is movable in the direction of an opening plane of the retaining opening of the vehicle body reinforcement, is provided between the proximal fastening foot and the distal retaining clip to retain the fastener in the retaining opening. It is thus possible to pull the fastener as a whole somewhat out of the retaining opening, in order to form an opening space for unfolding an airbag between the inner panel and the vehicle body reinforcement.

22 Claims, 3 Drawing Sheets

FASTENER AND METHOD FOR TRIGGERING A SIDE AIRBAG

CROSS-REFERENCE TO RELATED APPLICATION

This application claims priority to German Patent Application No. 102009041130.5, filed Sep. 14, 2009, which is incorporated herein by reference in its entirety.

TECHNICAL FIELD

The invention relates to a fastener, with the aid of which an inner panel of a motor vehicle can be connected to a vehicle body reinforcement, and a method for triggering a side airbag, in which such a connection means can be used.

BACKGROUND

Situating a side airbag between an inner panel and a vehicle body reinforcement of a motor vehicle is known from EP 0 873 916 A1. In order that the side airbag can unfold, it is necessary that the inner panel can detach somewhat from the vehicle body reinforcement, in order to form a gap, through which the airbag can unfold. For this purpose, a retaining clip is permanently inserted into a retaining opening of the vehicle body reinforcement and connected via a belt to the inner panel. A maximum opening space between the inner panel and the vehicle body reinforcement is delimited by the belt. The retaining clip is implemented as hollow in the interior and has a further retaining clip in the interior, to which a web connected to the inner panel can be permanently clipped. In the clipped state of the web with the retaining clip, the opening space between the inner panel and the vehicle body reinforcement is closed. Upon unfolding of the side airbag, the unfolding airbag presses against the inner panel with such a high force that the web breaks at an intended breakpoint and the inner panel is only still connected via the belt and the retaining clip to the vehicle body reinforcement, so that the side airbag can unfold through the resulting opening space.

Such a fastening of the inner panel with the vehicle body reinforcement has the disadvantages of the complicated construction and the high repair expenditure after triggering of the side airbag.

It is at least one object of the invention to provide a fastener for an inner panel of a motor vehicle and a method for triggering a side airbag, with the aid of which simple fastening of the inner panel to a vehicle body reinforcement is possible, without increasing the repair expenditure after triggering of the airbag.

SUMMARY

The fastener according to an embodiment of the invention for an inner panel of a motor vehicle has a proximal fastening foot for connection to the inner panel and a distal retaining clip for captive fastening in a retaining opening of a vehicle body reinforcement. A retaining ramp, which is movable in the direction of an opening plane of the retaining opening of the vehicle body reinforcement, is provided between the proximal fastening foot and the distal retaining clip to retain the fastener in the retaining opening.

The fastening of the inner panel to the vehicle body reinforcement can be performed via the retaining ramp pressing against the retaining opening. Because the functional surfaces of the retaining ramp and the distal retaining clip, which are provided for retaining, are spaced apart from one another, the retaining clip is spaced apart from the retaining opening of the vehicle body reinforcement in the non-inflated state of the airbag. In the normal state, i.e., in the non-unfolded state of the airbag, only the at least one retaining ramp is in contact with the retaining opening of the vehicle body reinforcement, while the retaining clip is positioned, essentially without function, spaced apart from the retaining opening.

Upon the fastening of the fastener to the retaining opening, firstly the distal end of the fastener is inserted into the retaining opening and the distal retaining clip is inserted through the retaining opening, until the inner panel presses against the motor vehicle body. In this normal state, the retaining ramp presses against the retaining opening of the vehicle body reinforcement. Because of the ramped design of the retaining ramp and the mobility of the retaining ramp transversely to the insertion direction, play between the retaining ramp and the retaining opening can be eliminated automatically. Furthermore, a traction force can be applied to the inner panel toward the vehicle body reinforcement, in order to allow the most continuous possible contact of the inner panel. Because of the mobility of the retaining ramp in the direction of the opening plane of the retaining opening, i.e., essentially transversely to the insertion direction, the retaining ramp can be moved away from the edge of the retaining opening. When the airbag inflates and thus exerts a force on the inner panel, in the event of a comparatively low force, the retaining ramp can be moved away from the retaining opening, so that the fastener as a whole can be pulled partially out of the retaining opening, until the distal retaining clip stops on the vehicle body reinforcement in the area of the retaining opening and prevents a further movement of the inner panel away from the vehicle body reinforcement.

Because of the low force which the airbag must exert on the inner panel, in order to form an opening space between the inner panel and the vehicle body reinforcement, the airbag can reach its final position more rapidly, whereby the risk of injury in the event of an accident is reduced. Simultaneously, it is possible after an inflation of the airbag to replace the airbag and to press the inner panel back onto the vehicle body during a repair, in order to reproduce the previous normal state. A replacement of functional elements intentionally destroyed at intended breakpoints is not required, so that the repair expenditure is reduced. In particular, the fastener can be designed in one piece, so that multiple interlocking functional components are avoided. This results in a simplified construction of the fastener and avoids complicated connection technology. Furthermore, with the aid of the fastener, the inner panel can be easily clipped to the vehicle body reinforcement during the assembly of the motor vehicle, without poorly visible screw connections being required. Because of the mobility of the retaining ramp, thermal expansion affects, in the event of particularly high or particularly low external temperatures, may be compensated for automatically. Alternatively, the fastener can also be connected to the vehicle body reinforcement and inserted into a retaining opening of the inner panel. The embodiments of the invention is explained hereafter on the example of a fastener fastened to the inner panel, the kinematic reversal, in that the fastener is connected to the motor vehicle body and/or the vehicle body reinforcement and inserted into a retaining opening of the inner panel, also being possible in each case.

The retaining ramp is preferably designed as yielding in the direction of the opening plane in the event of a force perpendicular to the opening plane of the retaining opening. If a force is applied opposite to the insertion direction of the fastener upon inflation of the airbag, in the event of a sufficiently high force, which particularly is above the weight force of the inner panel, the retaining ramp can yield and end its retaining function. Through the yielding of the retaining ramp, for example, a blocking, detent, or locking function of the retaining ramp can be canceled out, so that the fastener can be pulled out of the retaining opening at least in the area of the retaining ramp.

The retaining ramp is particularly preferably shaped in such a manner that the retaining ramp exerts a spring force on an edge of the retaining opening in the state inserted into the retaining opening. Through the spring force, a sufficiently high friction force can be applied between the retaining ramp and the edge of the retaining opening to be able to bear the weight force of the inner panel. The inner panel can thus be securely retained in the normal state solely via the at least one retaining ramp of the at least one fastener. The level of the spring force can be simultaneously set in such a manner that upon an inflation of the airbag, a comparatively small force must be exerted by the airbag on the fastener in order to overcome the friction force applied by the retaining ramp.

In a preferred embodiment, the fastener is produced from a strip material, which is metal in particular. In particular, the retaining clip is implemented by retaining wings, which can be stamped and bent out of the strip material. The fastener can thus particularly be produced cost-effectively from an endless material by simple bending and stamping methods, in particular without additional heat expenditure. The fastener thus produced can be, in the case of an inner panel produced by plastic injection molding, injected in the material of the inner panel during the injection molding of the inner panel. The production costs may thus be reduced further and a particularly secure bond can be achieved between the inner panel and the fastener.

A constriction preferably adjoins the fastening foot. The retaining ramp can adjoin the constriction, the retaining ramp running outward from the constriction in the distal direction from a center line of the fastener along a fastening direction. The constriction is particularly dimensioned in such a manner that the spacing of the outer sides of the constriction transversely to the insertion direction is less than the spacing of the inner side of the retaining opening. It is thus ensured that the fastener is held via the retaining ramp in the retaining opening. The retaining ramp, which runs diagonally outward, particularly begins in the area of the constriction at a spacing which is always less than the retaining opening. The spacing can extend outward up to a spacing transversely to the insertion direction, which is always greater than the spacing of the retaining opening. Because of the mobility of the retaining ramp in the direction of the plane of the retaining opening, the retaining ramp can nonetheless be inserted into the retaining opening and press essentially without play against the inner edge of the retaining opening. Via the maximum spacing of the outer sides of the fastener in the area of the retaining ramp, the maximum retaining force can be set, which must be overcome by an unfolding airbag to detach the inner panel from the vehicle body reinforcement.

In particular, a free ramp adjoins the retaining ramp in the distal direction. The free ramp can run inward from the retaining ramp in the distal direction from a center line of the fastener along a fastening direction, the free ramp being connected to the retaining ramp in particular via a setback which runs inward in the fastening direction. The free ramp is particularly shaped in such a manner, preferably with the aid of the setback, that a friction contact of the free ramp with the inner edge of the retaining opening is avoided or at least kept low. Through the extension of the free ramp in the fastening direction, the resulting opening space between the inner panel and the vehicle body reinforcement in the event of an inflating airbag can be set precisely. The distal retaining clip can adjoin the free ramp, which securely holds back the inner panel in particular even at forces 500 N, in particular 600 N, preferably 700 N, and particularly preferably 800 N, without being damaged. The retaining clip can end at the distal end of the fastener, in particular in a rounded tip, which makes it easier to insert the fastener into the retaining opening.

The retaining ramp is particularly preferably shaped in such a manner that at a predefined opening force, the retaining ramp is detached from the retaining opening. The predefined opening force can particularly be set via the maximum spacing of the outer faces of the fastener in the area of the retaining ramp. In particular, the predefined opening force corresponds to a friction force, which can be applied by a spring force of the retaining ramp in the area of the maximum spacing of the outer faces of the fastener in the area of the retaining ramp. The predefined opening force is particularly higher than the weight force of the inner panel connected to the fastener.

A spacing d between the retaining ramp and the retaining clip is preferably selected in such a manner that the spacing d at least corresponds to a minimal opening space between the inner panel and the vehicle body reinforcement for the unfolding of an airbag. The spacing d essentially corresponds to the distance by which the fastener can be pulled out of the retaining opening upon unfolding of the airbag. Via corresponding dimensioning of the spacing d, the intended minimal opening space between the inner panel and the vehicle body reinforcement can be ensured, so that the airbag can unfold through the opening space up into its intended final position.

Furthermore, an inner panel is provided in accordance with an embodiment of the invention, in particular a side panel, for a motor vehicle, the inner panel having a panel wall for receiving an airbag, in particular a side airbag. The inner panel further has a fastener connected to the panel wall, which can be implemented and refined as described above, for fastening to a vehicle body reinforcement, in particular an A column. Because multiple individual components to be connected to one another are avoided for the fastener, the design is simplified. Simultaneously, intended breakpoints and the replacement of components which are intentionally damaged upon unfolding of the airbag are avoided, so that the repair expenditure is reduced. The inner panel can be refined as explained above on the basis of the fastener.

The panel wall of the inner panel preferably has an airbag opening in the direction toward the vehicle body reinforcement, the airbag opening being shaped in such a manner that the airbag is supportable upon inflation on the vehicle body reinforcement to apply an opening force to the panel wall. The inflating airbag can thus inflate through the airbag opening in the direction toward the vehicle body reinforcement and use the vehicle body reinforcement as a bearing, in order to exert a force on the panel wall. A force can thus be exerted on the fastener by the airbag opposite to the insertion direction of the fastener via the panel wall of the inner panel, in order to be able to pull the fastener partially out of the retaining opening.

Furthermore, the embodiments of the invention relate to a vehicle body element, in particular a vehicle body reinforcement, for a motor vehicle, which has a fastener in particular for fastening an inner panel, the fastener being able to be implemented and refined as described above. Because multiple individual components to be connected to one another are avoided for the fastener, the design is simplified. Simultaneously, intended breakpoints and the replacement of components which are intentionally damaged upon unfolding of the airbag are avoided, so that the repair expenditure is reduced. The vehicle body element can be refined as explained above on the basis of the fastener and/or on the basis of the inner panel.

Furthermore, the embodiments of the invention relate to a method for triggering a side airbag, which is situated in an inner panel connected via a fastener to a retaining opening of a vehicle body reinforcement. After the beginning of an inflation of the side airbag, the fastener as a whole is moved in the direction of the vehicle interior to form an opening space to unfold the side airbag between the inner panel and the vehicle body enforcement through the opening space. After formation of the opening space, the fastener holds back the inner panel captively in the retaining opening of the vehicle body reinforcement. The fastener can be implemented and refined as described above in particular. Furthermore, the inner panel can be implemented and refined as described above. Because the fastener can be partially pulled out of the retaining opening during inflation of the airbag, through a simple design measure, if needed an opening space arises between the inner panel and the vehicle body reinforcement, through which the side airbag can unfold. Furthermore, during the unfolding of the airbag, components which are intentionally destructible at target breakpoints can be avoided, so that the repair expenditure after triggering of the side airbag is reduced.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
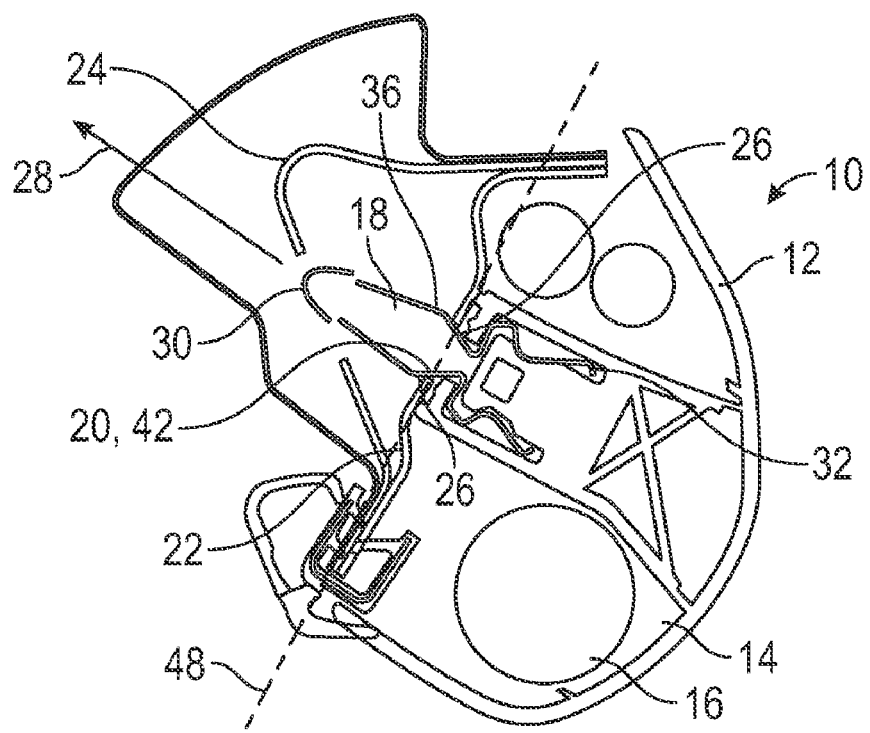
FIG. 1 shows a schematic sectional view of an inner panel of a motor vehicle.

The inner panel 10 of a motor vehicle shown in FIG. 1 has a panel wall 12, which forms a cavity 14 for an airbag 16. The inner panel 10 has a fastener 18, via which the inner panel 10 is connected to a retaining opening 20 of a vehicle body reinforcement 22, which can particularly be part of an A column 24. The fastener 18 is clamped via two diametrically opposing retaining ramps 26 in the retaining opening 20. For this purpose, the fastener 18 can be inserted into the retaining opening 20 in the direction of an insertion direction 28. The panel wall 12 is open toward the vehicle body reinforcement 22, so that the airbag 16 can be supported on the vehicle body reinforcement 22 during inflation. The airbag 16 thus simultaneously applies a force to the panel wall 12, via which a force is in turn applied opposite to the insertion direction 28 to the fastener 18. The retaining ramps 26 of the fastener 18 can yield inward in the event of this strain, so that the fastener 18 as a whole can be pulled partially out of the retaining opening 20, until a distal retaining clip 30 on a distal end of the fastener 18 stops on the vehicle body reinforcement 22 in the area of the retaining opening 20 and prevents a further movement of the panel wall 12 away from the vehicle body reinforcement 22.

Figure 2:
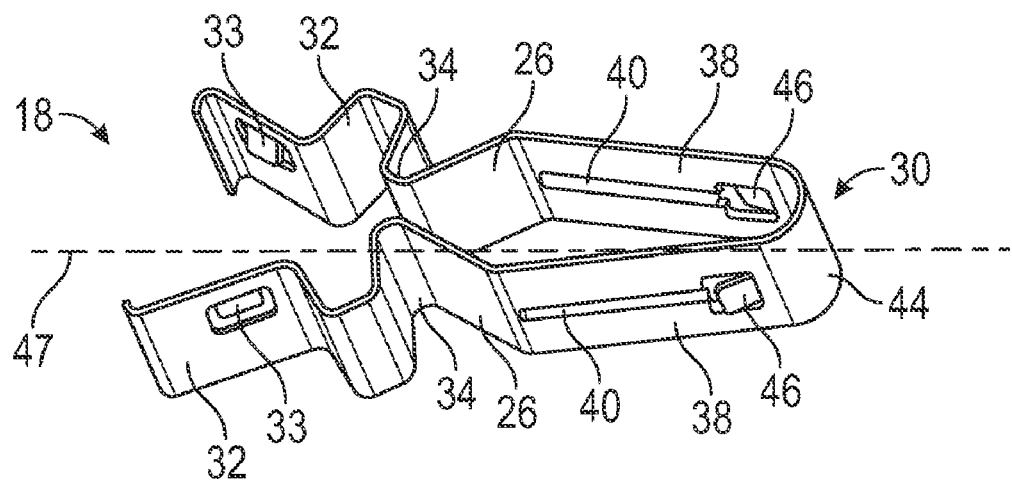
FIG. 2 shows a schematic perspective view of a fastener of the inner panel.

As shown in FIG. 2, the fastener 18 is produced from a metal strip material, which can be connected via two fastening feet 32 to the inner panel 10 or the vehicle body reinforcement 22. In the illustrated exemplary embodiment, the fastening feet 32 form a clip, with the aid of which the fastener 18 can be captively fastened to an undercut of the inner panel 10. For a better hold, the fastening feet 32 each have a catch 33, in order to be able to apply an additional retaining force transversely to the insertion direction 28. A constriction 34 adjoins the fastening feet 32, on which the retaining ramps 26 in turn adjoin. Free ramps 38 adjoin the retaining ramps 26, optionally via a setback 36. The free ramps 38 have depressions 40 produced by embossing, to increase the stiffness of the free ramps 38. The distal retaining clip 30, which simultaneously forms a rounded tip 44 of the fastener 18, adjoins the free ramps 38. The distal retaining clip 30 has retaining wings 46, which are stamped out of the strip material and bent outward. The fastener 18 is implemented as symmetrical to a center line 47 running in the insertion direction 28, only the fastening feet 32 being able to have a differing length, in order to form a twist lock in the inserted state. The retaining ramp 26 and the free ramp 38 are implemented at an angle to one another, so that a maximum spacing of the fastener 18 transversely to the insertion direction 28 results in the area of the connection point between the retaining ramp 26 and the free ramp 38, via which the force can be set, at which the fastener 18 can be detached via the yielding holding ramps 26.

Figure 3:
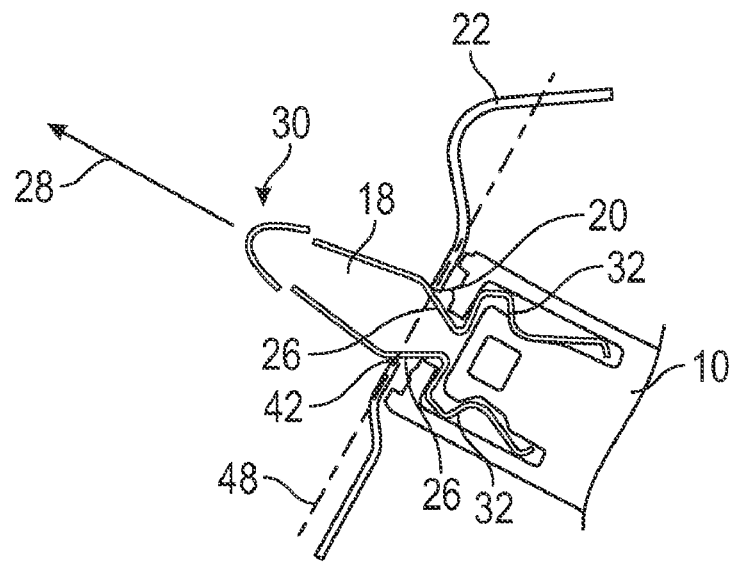
FIG. 3 shows a schematic sectional view of the fastener in a first position.
Figure 4:
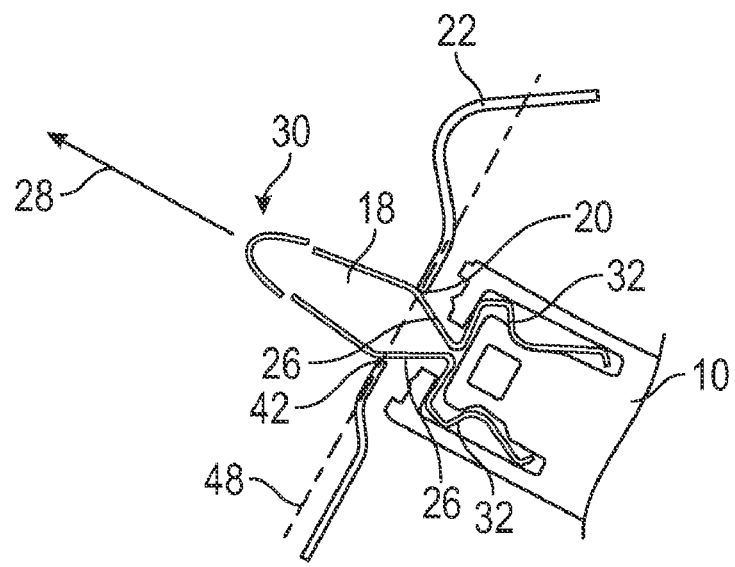
FIG. 4 shows a schematic side view of the fastener from FIG. 3 in a second position.
Figure 5:
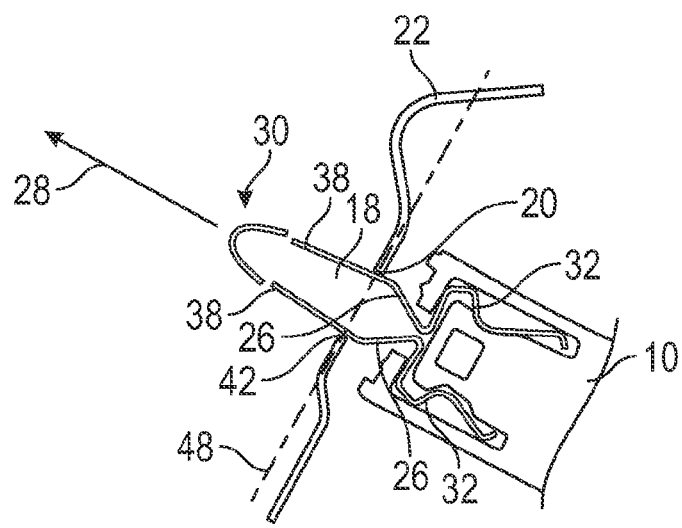
FIG. 5 shows a schematic side view of the fastener from FIG. 3 in a third position.
Figure 6:
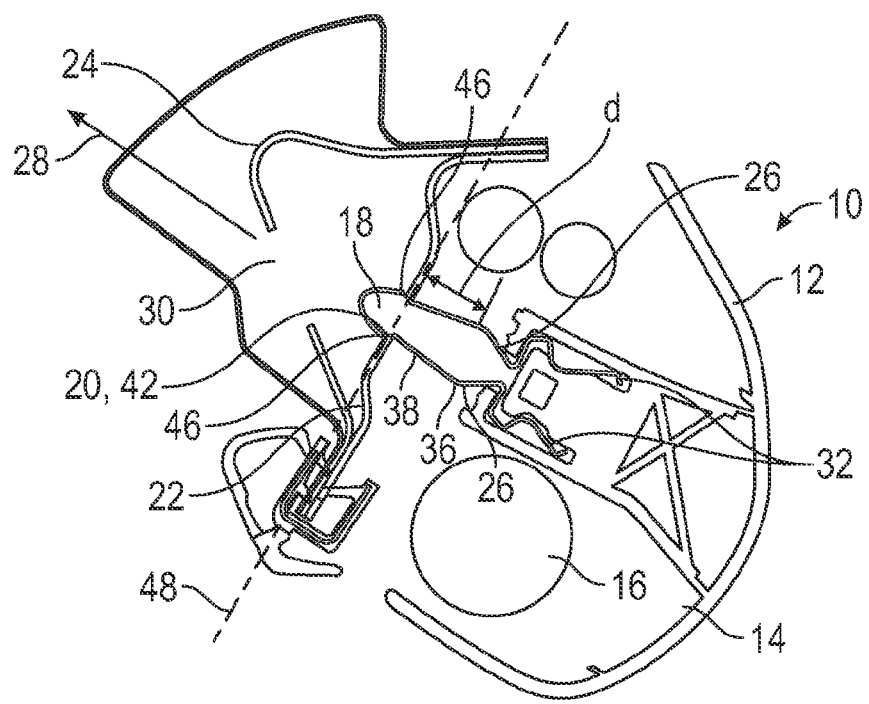
FIG. 6 shows a schematic side view of the fastener from FIG. 3 in a fourth position.

In the normal state of the fastening of the inner panel 10 to the vehicle body reinforcement 22 shown in FIG. 3, the fastener 18 is securely retained in the retaining opening 20 via the retaining ramps 26. When the airbag 16 unfolds and applies a force opposite to the insertion direction 28, the fastener 18 is first pulled somewhat out of the retaining opening 20 and retained by the retaining ramp 26 in the area of a greater nominal spacing (FIG. 4). The retaining ramps 26 are sprung back somewhat inward in the direction of the opening plane 48 defined by the retaining opening 20 for this purpose. When the force opposite to the insertion direction 28 rises further due to the inflating airbag, the maximum retaining force applied by the retaining ramps 26 is overcome, so that the fastener 18, as shown in FIG. 5, presses against the retaining opening 20 via the free ramp 38 with a lesser force. In this state, the fastener 18 is pulled out of the retaining opening 20 relatively rapidly, until the distal retaining clip 30 stops against the vehicle body reinforcement 22 as a captive securing element and prevents further pulling of the fastener 18 out of the retaining opening 20 (FIG. 6). The fastener 18 may thus be pulled as a whole somewhat out of the retaining opening 20 by at least a distance d, in order to form an opening space between the inner panel 10 of the motor vehicle reinforcement 22, through which the airbag 16 can unfold.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A fastener for an inner panel of a motor vehicle, comprising
two proximal fastening feet configured to engage a construction within the inner panel, each of the two proximal fastening feet including a catch comprised of a perforation through each of the two proximal fastening feet circumferentially defined completely by the surface of the respective fastening foot, each perforation retaining an inwardly biased tab attached to each fastening foot at a point on the circumference of the perforation;
a distal retaining clip configured to captively fasten in a retaining opening of a vehicle body reinforcement; and
a retaining ramp between each of the proximal fastening feet and the distal retaining clip, which is configured to move in a direction of an opening plane of the retaining opening of the vehicle body reinforcement to retain the fastener in the retaining opening.

2. The fastener according to claim 1, wherein the retaining ramp is configured to yield in the direction of the opening plane in an event of a force perpendicular to the opening plane of the retaining opening.

3. The fastener according to claim 1, wherein the retaining ramp is shaped such that the retaining ramp is configured to exert a spring force on an edge of the retaining opening in the state inserted into the retaining opening.

4. The fastener according to claim 1, wherein the fastener is produced from a strip material, wherein the distal retaining clip is implemented by retaining wings, which can be stamped and bent from the strip material.

5. The fastener according to claim 4, wherein the strip material is a metal.

6. The fastener according to claim 1, wherein a constriction adjoins the proximal fastening foot, and the retaining ramp is configured to adjoin a constriction, the retaining ramp running outward from the constriction in a distal direction from a center line of the fastener along a fastening direction.

7. The fastener according to claim 6, wherein a free ramp is configured to adjoin the retaining ramp in the distal direction, and the free ramp is configured to run inward from the retaining ramp in the distal direction from the center line of the fastener along the fastening direction, the free ramp connected to the retaining ramp with a setback that runs inward in the fastening direction.

8. The fastener according to claim 1, wherein the retaining ramp is shaped such that at a defined opening force, the retaining ramp is detached from the retaining opening.

9. The fastener according to claim 1, wherein a spacing between the retaining ramp and the distal retaining clip is selected in such a manner that a spacing at least corresponds to a minimum opening space between the inner panel and the vehicle body reinforcement for unfolding an airbag.

10. An inner panel for a motor vehicle, comprising:
a panel wall configured to receive an airbag; and
a fastener connected to the panel wall configured to engage a vehicle body reinforcement, the fastener comprising:
two proximal fastening feet configured to engage a construction within the panel wall, each of the two proximal fastening feet including a catch comprised of a perforation through each of the two proximal fastening feet circumferentially defined completely by the surface of the respective fastening foot, each perforation retaining an inwardly biased tab attached to each fastening foot at a point on the circumference of the perforation;
a distal retaining clip configured to captively fasten in a retaining opening of the vehicle body reinforcement; and
a retaining ramp between each of the proximal fastening feet and the distal retaining clip, which is configured to move in a direction of an opening plane of the retaining opening of the vehicle body reinforcement to retain the fastener in the retaining opening.

11. The inner panel according to claim 10, wherein the inner panel is a side panel.

12. The inner panel according to claim 10, wherein the vehicle body reinforcement is an A column.

13. The inner panel according to claim 10, wherein the panel wall comprises an airbag opening in the direction toward the vehicle reinforcement, the airbag opening shaped in such a manner that the airbag can be supported on the vehicle body reinforcement during inflation to apply an opening force to the panel wall.

14. The inner panel according to claim 10, wherein the retaining ramp is configured to yield in the direction of the opening plane in an event of a force perpendicular to the opening plane of the retaining opening.

15. The inner panel according to claim 10, wherein the retaining ramp is shaped such that the retaining ramp is configured to exert a spring force on an edge of the retaining opening in the state inserted into the retaining opening.

16. The inner panel according to claim 10,
wherein the fastener is produced from a strip material, wherein the distal retaining clip is implemented by retaining wings, which can be stamped and bent from the strip material.

17. The inner panel according to claim 16, wherein the strip material is a metal.

18. The inner panel according to claim 10, wherein a constriction adjoins the proximal fastening foot, and the retaining ramp is configured to adjoin a constriction, the retaining ramp running outward from the constriction in a distal direction from a center line of the fastener along a fastening direction.

19. The inner panel according to claim 18, wherein a free ramp is configured to adjoin the retaining ramp in the distal direction, and the free ramp is configured to run inward from the retaining ramp in the distal direction from the center line of the fastener along the fastening direction, the free ramp connected to the retaining ramp with a setback that runs inward in the fastening direction.

20. The inner panel according to claim 10, wherein the retaining ramp is shaped such that at a defined opening force, the retaining ramp is detached from the retaining opening.

21. The inner panel according to claim 10, wherein a spacing between the retaining ramp and the distal retaining clip is selected in such a manner that a spacing at least corresponds to a minimum opening space between the inner panel and the vehicle body reinforcement for unfolding the airbag.

22. A method for triggering a side airbag, which is situated in an inner panel, which is connected with a fastener to a retaining opening of a vehicle body reinforcement, comprising the steps of:
connecting a pair of proximal fastening feet to the inner panel, each of the pair of proximal fastening feet configured to engage a construction within the inner panel, each of the pair of proximal fastening feet including a catch comprised of a perforation through each of the proximal fastening feet circumferentially defined completely by the surface of the respective fastening foot, each perforation retaining an inwardly biased tab attached to each fastening foot at a point on the circumference of the perforation;

captive fastening with a distal retaining clip in the retaining opening of the vehicle body reinforcement; and retaining the fastener in the retaining opening with a retaining ramp between each of the proximal fastening feet and the distal retaining clip, which is configured to move in a direction of an opening plane of the retaining opening of the vehicle body reinforcement;

beginning an inflation of the side airbag;

after the beginning of the inflation of the side airbag, moving the fastener as a whole in the direction of a motor vehicle interior to form an opening space for unfolding the side airbag between the inner panel and the vehicle body reinforcement through the opening space; and holding back the inner panel captively in the retaining opening of the vehicle body reinforcement after formation of the opening space with the fastener.

* * * * *